March 21, 1933.　　　C. N. SHUSTER　　　1,901,880

DEVICE FOR DETERMINING ALTITUDES AND TRIGONOMETRIC FUNCTIONS THEREOF

Filed Sept. 17, 1930　　　2 Sheets-Sheet 1

Inventor
Carl N. Shuster
By George B. Pitts
Attorney

March 21, 1933. C. N. SHUSTER 1,901,880
DEVICE FOR DETERMINING ALTITUDES AND TRIGONOMETRIC FUNCTIONS THEREOF
Filed Sept. 17, 1930 2 Sheets-Sheet 2
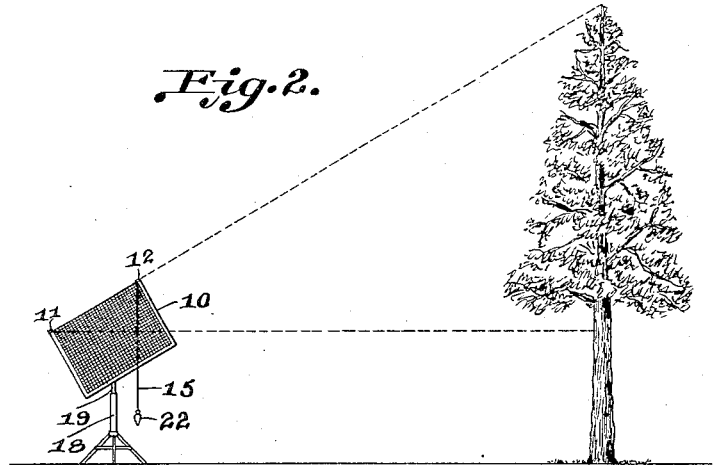
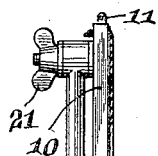
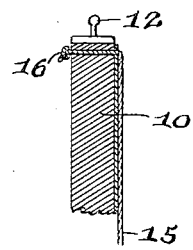
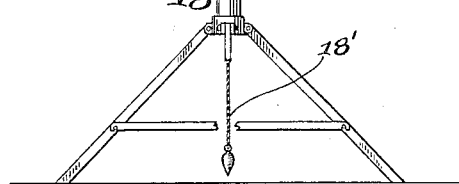
Inventor
Carl N. Shuster
By George B. Pitts
Attorney Patented Mar. 21, 1933

1,901,880

UNITED STATES PATENT OFFICE

CARL N. SHUSTER, OF WEST ORANGE, NEW JERSEY, ASSIGNOR TO LAFAYETTE INSTRUMENTS, INC., OF NEW YORK, N. Y., A CORPORATION OF NEW YORK

DEVICE FOR DETERMINING ALTITUDES AND TRIGONOMETRIC FUNCTIONS THEREOF

Application filed September 17, 1930. Serial No. 482,594.

The present invention relates to educational appliances, and more particularly to an instrument or device which furnishes a physical and graphical conception of different angular arrangements with respect to trigonometric functions, and to provide a device which may itself be directly used and adjusted for determining altitudes, for use as a clinometer and which also provides a graphic table of tangents, sines and co-sines carried to three decimal places.

Another object of the present invention is to provide an appliance of this character which may be used in the manner of a hypsometer for determining altitudes and by means of which the height of any object may be observed on the instrument when properly adjusted so that the height or altitude is determined in the most direct and easiest manner possible, and without computations or the use of mathematical formulæ.

Another object of the present invention is to provide an educational appliance designed especially for use in junior high schools, senior high schools, and by scouts. The invention embodies features indispensible in the teaching of trigonometry, intuitive geometry, and plane and solid geometry, and to provide an appliance where in a large number of intersecting geometry originals that depend upon the construction and use of the hypsometer may be given.

The invention further aims in the provision of an appliance which may also be used for a rapid approximate leveling job and by use of which practical engineers and other workers will find the appliance handy in practically any line of work where it is necessary to find heights and slopes.

The invention also aims to produce an appliance which is of light construction, low cost to produce and which embodies features of the utmost simplicity in both construction and use.

With the foregoing and other objects in view, the invention will be more fully described hereinafter, and will be more particularly pointed out in the claim appended hereto.

In the drawings, wherein like symbols refer to like or corresponding parts throughout the several views.

Figure 2 is a side elevation of the device, shown somewhat diagrammatically, adjusted to an object for determining the altitude and other calculations with respect to the angles indicated on the device.

Figure 3 is an edge view of the appliance, and

Figure 4 is an enlarged transverse section taken through the forward upper corner of the chart board, showing the mounting of the plumb-line therein.

Figure 1:
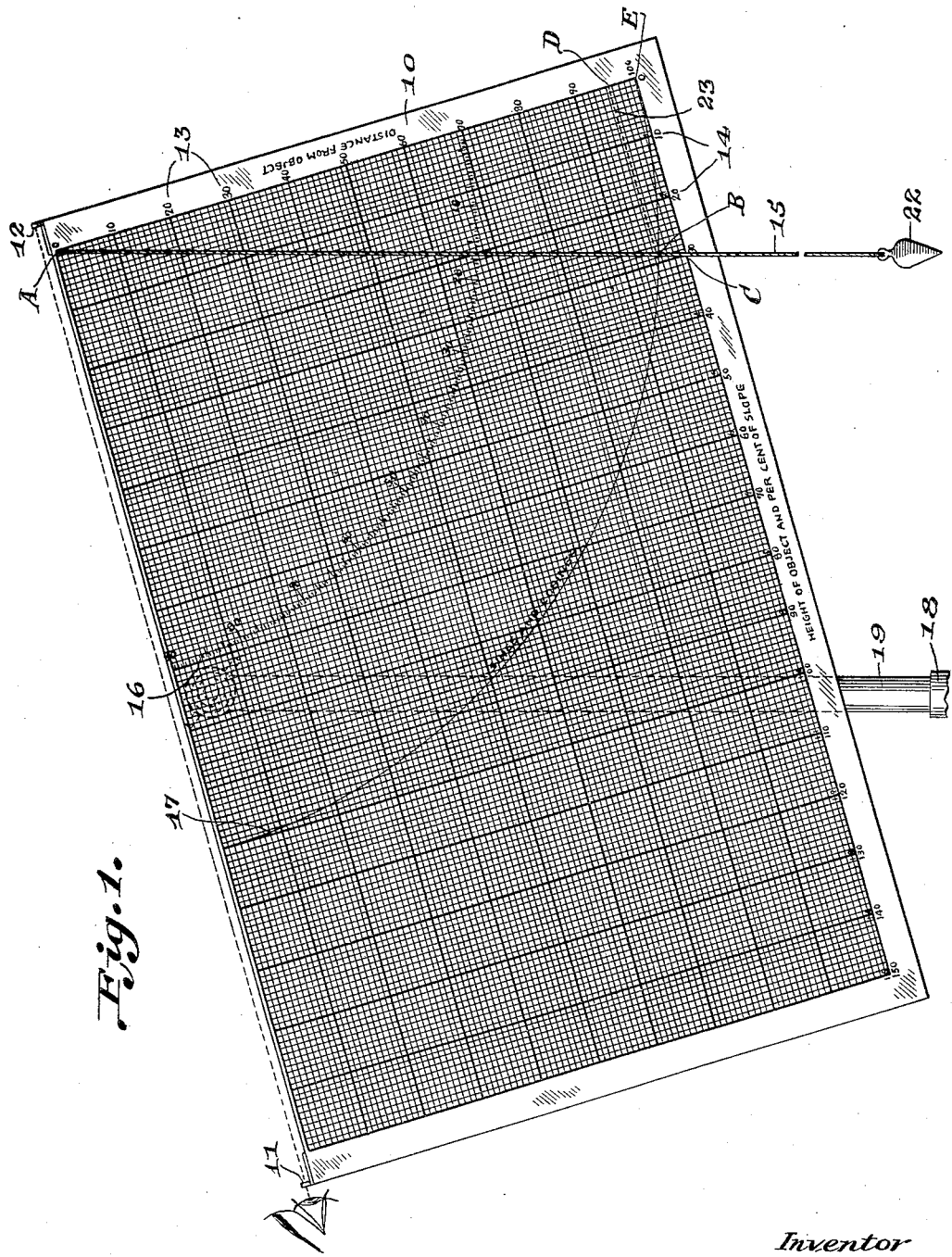
Figure 1 is a side elevation of an educational appliance constructed according to the present invention, part of the plumb-line being broken away and the device being tilted for adjustment as to the height of a distant object.

Referring now to the drawings, the appliance preferably comprises a chart board 10 which is preferably of rectangular configuration and provided with a pair of sights 11 and 12 of any suitable construction and which are adapted to be aligned axially with respect to the top of a distant object and to determine the angle of tilt of the chart board 10, such as is shown in Figures 1 and 2.

The face of the chart board 10 is provided thereon with longitudinal and transverse lines which intersect to provide squares, and the longitudinal lines are preferably indexed in units of distance, such as shown at 13, and which consecutively increase in significance from the forward upper corner of the chart board 10 to the lower forward corner thereof.

The transverse lines of the chart are also appropriately designated in desired units for showing the height of an object and the percentage of slope where the latter is to be determined, this scale of the transverse lines being shown at 14 and consecutively increasing from the lower right hand corner of the chart backwardly. The squares which are thus formed on the face of the chart mark off a certain number of units of the respective scales 13 and 14, and in order to more definitely determine a correct reading on the chart, the chart may be provided with any desired number of intermediate relatively light longitudinal and transverse lines which intersect to divide each large square into a number of small squares and to thus admit of the accurate reading of the units and fractions thereof as may be determinated as hereinafter pointed out.

The axis or center of the board is the upper right hand corner thereof, and such center point is apertured for the reception of a plumb-line 15 therethrough, as shown in Figure 4, the plumb-line being knotted as at 16 against the rear side of the chart board 10 to maintain the plumb-line 15 from pulling out of the opening, and also to admit of the free swinging of the plumb-line to maintain a normally vertical position during the various adjustments of the chart board 10 in its vertical plane.

The plumb-line 15 is of suitable length so that it may traverse the entire diagonal length of the board 10 according to the angle of tilt of the board, and in Figure 1 the chart board 10 is shown as tilted at an angle of substantially 17 degrees as noted on the concentric scale 16 which is formed on the face of the chart. The chart is also provided with an outer concentric line 17 which may be utilized for determining the sines and co-sines with respect to the plumb-line 15.

The chart board 10 may be supported in any desired manner but preferably a stand 18 is provided comprising a lower section carrying diverging legs and an upper section 19 telescoping into the lower section and adjustably secured thereto by a binding screw 20 or the like as shown in Figure 3.

The telescoping section 19 may have a suitable scale 19' to co-operate with the lower section 18 and show the height of the chart board 10 after adjustment and without the necessity of actual measurement after each adjustment and use of the device.

The lower end of the section 18 carries a plumb 18' for suspension between the legs of the stand or support for determining the proper location of the device relatively to the object whose height is measured.

The upper end of the stand section 19 is apertured for the reception of a threaded bolt therethrough which has a winged head 21. The bolt is adapted to pass through the upper end of the section 19 and into the rear side of the chart board 10, in order to hold the latter on the upper end of the standard and to facilitate the binding of the board 10 after it has been adjusted. The plumb-line 15 is provided with a weight 22 or the like on its lower free end so as to maintain the plumb-line 15 substantially vertical at all times.

In use, the appliance is set up on the stand to the desired height, such as five feet; with the plumb 18' in registry over a spot or other position indicating means on the ground to designate the distance of the device from the object whose altitude is to be determined; and the winged screw 21 is released so that the chart board 10 may be swung in edgewise direction and in its vertical plane to line the chart board in the position required by the sights 11 and 12 to dispose the upper edge of the chart board co-incident with the line of vision with the topmost point of the object.

When the chart board is thus adjusted, see Figure 1, the plumb-line 15 maintaining a vertical position sets off on the chart board a triangle of definite proportions which are dependent upon the required adjustment of the chart board 10 to properly line it with the object. Thus, by using this appliance there is visually displayed the various angles, distances, sines and co-sines and other data with respect to the triangle.

The chart board 10 may contain along its forward margin the legend "Distance from object", and the chart may have at its lower margin a second legend reading "Height of object and percent of slope."

As shown in Figure 1, when the appliance is adjusted so that the plumb-line 15 defines an angle of substantially 17 degrees on the chart, the hypotenuse of the triangle is indicated between A and B along the plumb-line. The line 23 which is longitudinal from the zero transverse line to the point of intersection between the sine and co-sine curve and the plumb-line 15 gives the sine of the angle as designated between B and D while the extension of the hypotenuse, BC, provides a point of reading on the lower longitudinal chart line between the points C and E of the tangent which is given by the length .295, and the line CE also shows the percent of slope which is 29.5. It will be noted that the line AD gives the co-sine of the angle which is .958 in the present instance, and it is apparent that from these given lengths and dimensions and also the quantities of the sine, co-sine and tangent various data may be accumulated and compiled, and various formulæ may be used for obtaining other information which cannot be illustrated or shown on the chart, or which could not be otherwise computed without knowing the basic qualities.

To find the height of the object observed follow down the line AE to determine the distance from the object until the point D is reached and this gives the distance that the observer is from the object. From the point D the line 23 may be followed out in parallel relation to the longitudinal lines which show height of object, until the point B is reached. This distance DB plus the height of the appliance, such as five feet, is the height of the object measured.

When the plumb-line 15 hangs along the line AE, the appliance is level and may be used for a rapid leveling job. The stand is adjustable so that the appliance or instrument may be raised or lowered to accomodate people of different heights, and any suitable means may be employed than as shown to accomplish this purpose but this distance of the instrument from the ground, as shown by the scale 19' on the section 19, must be added to the reading along the line 23 to determine the height of the object from the ground.

The chart board 10 may be constructed in any suitable manner, and may be in the form of a body plate of metal or a body board of wood or of composition material and to one side of which the chart may be secured by an adhesive, may be imprinted on the board 10, or may be pressed in any suitable manner in the surface of the board.

It is obvious that various changes and modifications may be made in the details of construction and design of the above specifically described embodiment of this invention without departing from the spirit thereof, such changes and modifications being restricted only by the scope of the following claim:

What is claimed is:—

A device for determining altitudes and the trigonometric functions thereof, comprising a chart board having on its face transverse and longitudinal intersecting lines with corresponding consecutively increasing indexes along the transverse and longitudinal marginal portions of the chart board with reference to the forward end thereof, said chart board also having concentric spaced arcuate lines intersecting the longitudinal and transverse lines and with their radii struck from a common center at the forward upper portion of the chart board, front and rear sights carried upon the upper edge of the chart board at the forward and rear corners thereof for determining the angular position of the chart board in a vertical plane with respect to the height of an object, scaled supporting means pivotally connected to the chart board for supporting the same and determining the height of the chart board from the horizontal supporting surface of the device, and a plumb line secured to the upper forward corner of the chart board and suspended across the face of said board for intersecting the transverse, longitudinal and concentric lines of the chart board when the latter is tilted when aligned with an object whereby to indicate on said chart board distances, height and trigonometric sines of triangles formed between the lines of the chart board and the plumb line.

In testimony whereof, I have hereunto affixed my signature.

CARL N. SHUSTER.